United States Patent
Gervaise

(10) Patent No.: US 9,429,666 B2
(45) Date of Patent: Aug. 30, 2016

(54) METHOD AND DEVICE FOR AUTOMATICALLY DETECTING MARINE ANIMALS

(75) Inventor: Cédric Gervaise, Brest (FR)

(73) Assignee: SERCEL, Carquefou (FR)

( * ) Notice: Subject to any disclaimer, the term of this patent is extended or adjusted under 35 U.S.C. 154(b) by 297 days.

(21) Appl. No.: 14/232,567

(22) PCT Filed: Jun. 19, 2012

(86) PCT No.: PCT/EP2012/061685
§ 371 (c)(1),
(2), (4) Date: May 5, 2014

(87) PCT Pub. No.: WO2013/007482
PCT Pub. Date: Jan. 17, 2013

(65) Prior Publication Data
US 2014/0293749 A1 Oct. 2, 2014

(30) Foreign Application Priority Data
Jul. 13, 2011 (EP) .................................... 11305917

(51) Int. Cl.
*G01V 1/00* (2006.01)
(52) U.S. Cl.
CPC ..................... *G01V 1/001* (2013.01)
(58) Field of Classification Search
CPC .............................. G01V 1/001; G01S 3/8083
See application file for complete search history.

(56) References Cited

U.S. PATENT DOCUMENTS

| | | | |
|---|---|---|---|
| 6,795,374 B2 * | 9/2004 | Barnes | G01S 7/52038 367/138 |
| 2003/0048698 A1 * | 3/2003 | Barnes | G01S 7/52038 367/181 |
| 2014/0293749 A1 * | 10/2014 | Gervaise | G01V 1/001 367/131 |

FOREIGN PATENT DOCUMENTS

| | | | | |
|---|---|---|---|---|
| AU | 2012283315 B2 * | 5/2015 | | G01V 1/001 |
| CN | 103649778 A * | 3/2014 | | G01V 1/001 |

(Continued)

OTHER PUBLICATIONS

Oliver Adam: "Advantages of the Hilbert Huang transform for marine mammals signals analysis", J. Acoust. Soc. Am. (2006), 120(5): 2965-2973.

(Continued)

*Primary Examiner* — Daniel Pihulic
(74) *Attorney, Agent, or Firm* — David D. Brush; Westman, Champlin & Koehler, P.A.

(57) ABSTRACT

A method is provided for automatically detecting marine animals, carried out by a detection device. The method includes obtaining acoustic signal measurements collected by at least one acoustic sensor in a underwater environment; and at least one of a first branch for detecting frequency modulated sounds and a second branch for detecting impulsive sounds; each branch comprising a step of detecting sounds by: implementing in parallel several detection channels each having a different and fixed value for at least one degree of freedom; selecting the detection channel having a maximum signal to noise ratio; and comparing the signal to noise ratio of the selected detection channel to a determined threshold. The method further includes taking an alarm decision, indicating the presence of at least one marine animal, as a function of an output of the first branch and/or an output of the second branch.

10 Claims, 5 Drawing Sheets

(56) References Cited

FOREIGN PATENT DOCUMENTS

| FR | CA 2838060 A1 | * | 1/2013 | ............. G01V 1/001 |
|----|---------------|---|--------|--------------------------|
| FR | WO 2013007482 A1 | * | 1/2013 | ............. G01V 1/001 |
| FR | EP 2546680 B1 | * | 6/2014 | ............. G01V 1/001 |
| RU | 2014102789 A | * | 8/2015 | ............. G01V 1/001 |

OTHER PUBLICATIONS

Gervaise et. al.: "Automatic detection of Bioacoustics impulses based on kurtosis under weak signal to noise ratio", Applied Acoustics, (2010), 71: 1020-1026.

Ioana et al.: "Analysis of underwater mammal vocalisations using time-frequency phase tracker," Applied Acoustics, (2010), 71: 1070-1080.

Kandia et al.: "Detection of sperm whale clicks based on the Teager-Kaiser energy operator," Applied Acoustics, (2006), 67: 1144-1163.

Mellinger et al.: "Recognizing transient low-frequency whale sounds by spectrogram correlation," The Journal of the Acoustical Society of America, (2000), 107: 3518-3529.

Zimmer et al.: "Passive acoustic detection of deep-diving beaked whales," The Journal of the Acoustical Society of America, (2008), 24: 2823-2832.

Special Issue: "Detection and Localization of Marine Mammals using Passive Acoustics", Canadian Acoustics, vol. 32, 2004.

Special Issue: "Detection and Localization of Marine Mammals using Passive Acoustics", Applied Acoustics, vol. 67, 2006.

Special Issue: "Detection and Classification of Marine Mammals using Passive Acoustics", Canadian Acoustics, vol. 36, Mar. 2008.

Special Issue: "Detection, Classification, Localization and Census of Marine Mammals with Passive Acoustics Monitoring", Applied Acoustics, vol. 71, 2010.

International Search Report and Written Opinion dated Sep. 28, 2012 for corresponding International Application No. PCT/EP2012/061685, filed Jun. 19, 2012.

Rustam Stolkin et al., "Feature Based Passive Acoustic Detection of Underwater Threats", Proceedings of SPIE, vol. 6204, Dec. 29, 2006, pp. 6204081-6204089, XP002667475.

Sylvain Busson et al., "Statistical Underwater Noise Level Estimation for Marine Mammals Whistle Detection", 10th Congress Francais d'Acoustique, Lyon, Apr. 16, 2010, XP002667476.

R.P. Morrissey et al., "Passive Acoustic Detection and Localization of Sperm Whales (Physeter Macrocephalus) in the Tongue of the Ocean" Applied Acoustics, vol. 67, 2006, pp. 1091-1105, XP002683969.

European Search Report and Written Opinion dated Aug. 28, 2012 for corresponding European Application No. 11 30 5917, filed Jul. 13, 2011.

International Preliminary Report on Patentability and Written Opinion dated Jan. 14, 2014for corresponding International Application No. PCT/EP2012/061685, filed Jun. 19, 2012.

* cited by examiner

ID AND DEVICE FOR AUTOMATICALLY DETECTING MARINE ANIMALS

1. CROSS-REFERENCE TO RELATED APPLICATIONS

This Application is a Section 371 National Stage Application of International Application No. PCT/EP2012/061685, filed Jun. 19, 2012, which is incorporated by reference in its entirety and published as WO 2013/007482 on Jan. 17, 2013, in English.

2. FIELD OF THE INVENTION

The field of the invention is that of signal processing and underwater acoustics.

More specifically, the invention pertains to a technique for automatically detecting marine animals, i.e. a technique that allows detection of the presence of marine animals from the detection of their sound emissions, using a PAD ("Passive Acoustic Detection") system.

The present invention can be applied notably, but not exclusively, for detecting the presence of marine mammals, including cetaceans (mysticetes and odontocetes).

For marine mammals, the sound production is divided into two families: the communication signals (frequency modulated signals, whistles) and the signals used to perceive their environment (pulses, clicks). For example, the whole sound production of cetaceans includes Very Low Frequencies emissions of mysticetes, Medium Frequencies emissions of odontocetes (whistles) and High Frequencies emissions of odontocetes (clicks).

It should be noted that if a PAD system allows to listen and detect signals of biological origin, it can also listen and detect any sound contribution parasite created by other activities.

A wide spectrum of applications of the invention is identified, from the needs of scientists working in the field of marine ecology who want to own tools of observation of marine animals, to the operators in the world of the sea who wish to limit the negative interactions of their activity on marine animals (fishing activity, military activity with emissions of sonar, geophysical data acquisition for analyzing the sea bed (e.g. oil prospecting industry using seismic method), etc).

3. TECHNOLOGICAL BACKGROUND

Corresponding to a strong need and supported by an active scientific community, numerous algorithmic solutions have been proposed for the detection of marine animals.

A series of international workshops held since 2003 echoes this dynamic:

Special Issue, "Detection and localization of marine mammals using passive acoustics", Canadian Acoustics, Vol. 32, 2004.

Special Issue, "Detection and localization of marine mammals using passive acoustics", Applied Acoustics, vol. 67, 2006.

Special Issue, "Detection and classification of marine mammals using passive acoustics", Canadian Acoustics, Vol. 36, 2008.

Special Issue, "Detection, classification, localization and census of marine mammals with passive acoustics monitoring", Applied Acoustics, vol. 71, 2010.

Through these four references, algorithmic solutions for the detection of clicks can be identified:

a) using the classic solution of the energy descriptor: W. Mr. X. Zimmer, J. Harwood, P. L. Tyack, P. Johnson, and P. T. Madsen, "Passive acoustic detection of deep-diving beaked whales", The Journal of the Acoustical Society of America, vol. 124, pp. 2823-2832, 2008.

b) using the original solution of the Teager descriptor: V. Kandia and Y. Stylianou, "Detection of sperm whale clicks based On The Teager-Kaiser energy operator", Applied Acoustic, Vol. 67, pp. 1144-1163, 2006.

c) using the original solution of the kurtosis descriptor: C. Gervaise, A. Barazzutti, S. Busson, Y. Simard, and N. Roy, "Automatic detection of Bioacoustics impulses based on kurtosis under weak signal to noise ratio", Applied Acoustics, vol. 71, pp. 1020-1026, 2010.

For the detection of whistles, algorithmic solutions have been proposed:

a) using the spectrogram: D. K. Mellinger and C. W. Clark, "Recognizing transient low-frequency whale sounds by spectrogram correlation", The Journal of the Acoustical Society of America, Vol. 107, pp. 3518-3529, 2000.

b) using the Hilbert Huang Transform: Adam O (2006), "Advantages of the Hilbert Huang transform for marine mammals signals analysis", J. Acoust. Soc. Am 120: 2965-2973.

c) using the ambiguity function at higher orders and warping operators: C. Ioana, C. Gervaise, Y. Stephan, and J. I. March, "Analysis of underwater mammal vocalizations using time-frequency-phase tracker", Applied Acoustics, vol. 71, pp. 1070-1080, 2010.

In general, at best, the above known solutions have an adaptability in frequency (allowing to select the frequency band on which exists the signal, and to reject the ambient noise in other frequency bands) and they select a specific detection test, which is compared to an estimated value of this detection test in the case of a measurement noise alone.

Unfortunately, these known solutions suffer from several limitations:

they are not embeddable in an autonomous communicating system;

their performances are fixed or depend on the presence of a trained operator to adjust the settings or the architecture of the algorithmic solutions;

they do not adapt automatically to the properties (which are often variable) of biological sound productions;

they do not treat the entire sound production of marine animals in a single process;

they do not include learning and rejections of false alarms generated by ambient noise.

4. SUMMARY OF THE INVENTION

A particular embodiment of the invention proposes a method for automatically detecting marine animals, which is carried out by a detection device and comprises:

a step of obtaining acoustic signal measurements collected by at least one acoustic sensor in a underwater environment;

at least one of the following branches:

a first branch comprising a step of detecting frequency modulated sounds by: implementing in parallel several first detection channels each having a different and fixed value for at least one degree of freedom; selecting the first detection channel having a maximum signal to noise ratio; and comparing the signal to noise ratio of the selected first detection channel to a first determined threshold;

a second branch comprising a step of detecting impulsive sounds by: implementing in parallel several second detection channels each having a different and fixed value for at least one degree of freedom; selecting the second detection channel having a maximum signal to noise ratio; and comparing the signal to noise ratio of the selected second detection channel to a second determined threshold;

a step of taking an alarm decision, indicating the presence of at least one marine animal, as a function of an output of the first branch and/or an output of the second branch.

Thus, it is proposed an innovative method to process the measurements (sound pressure levels) collected by at least one acoustic sensor, in order to output a warning (alarm decision) that informs of the presence of one or several marine animals in the detection range of the acoustic sensor.

Each branch having several detection channels in parallel, this technique has numerous advantages: it has the capacity to adapt to the properties of biological sound sources and to the properties of ambient noise, and it can be executed automatically (without requiring an operator and with a minimum number of preliminary configuration settings).

When the two branches are used (one for processing frequency modulated sounds and the other for processing impulsive sounds), this technique allows to treat sound productions of different marine animals in a single process.

According to a particular feature, said at least one degree of freedom belongs to the group comprising:

methods, and corresponding parameters, to present the acoustic signal measurements in a new space of representation;

quantitative signal features in which the acoustic signal measurements are mapped in the new space of representation;

methods to estimate the noise characteristic.

Thus the parallel detection channels of each branch can carry out different detections and the quality of the alarm decision is enhanced.

According to a particular feature, each first detection channels uses a Fast Fourier transform, with a different length, to present the acoustic signal measurements in a new space of representation, and uses energy as a quantitative signal feature in which the acoustic signal measurements are mapped in the new space of representation.

This improves the processing of the frequency modulated sounds.

According to a particular feature, each second detection channel implements the following steps:

using a pass band filter, with a different pass band, to present the acoustic signal measurements in a new space of representation;

computing first and second signal to noise ratios using respectively a first and a second quantitative signal feature in which the acoustic signal measurements are mapped in the new space of representation, said first and second quantitative signal features being associated to different order statistics; and selecting a maximum ratio among the first and second signal to noise ratios, to be used in the step of selecting the second detection channel having a maximum signal to noise ratio.

This improves the processing of the impulsive sounds.

According to a particular feature, said first quantitative signal feature is energy associated to a second order statistic, and said second quantitative signal feature is kurtosis associated to a fourth order statistic.

This further improves the processing of the impulsive sounds.

According to a particular feature, at least one of said first and second branches comprises:

a step of learning, adapted to determine rejected points of a time-frequency grid, as a function of a plurality of successive actually detected sounds; and a step of rejecting, adapted to reject an actually detected sound which is located, in the time-frequency grid, on one of the rejected points;

and the step of taking an alarm decision is carried out as a function of the sound or sounds actually detected and not rejected.

This allows to identify abiotic sound detections (e.g. due to seismic apparatus) and to reject them.

According to a particular feature, said step of learning comprises the following steps, for at least one given point of the time-frequency grid:

obtaining a number of actually detected sounds which are mapped on said given point of the time-frequency grid, among a plurality of successive actually detected sounds over a determined number of iterations;

deciding that said given point of the time-frequency grid is a rejected point if said number is higher than a determined threshold.

This improves the step of learning.

According to a particular feature, the method is implemented in real time in said detection device, and it comprises a step of transmitting said alarm decision to a remote management device.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

A particular embodiment of the invention proposes a detection device for automatically detecting marine animals, comprising:

mean for obtaining acoustic signal measurements collected by at least one acoustic sensor in a underwater environment;

at least one of the following processing means:

a first processing mean, allowing to detect frequency modulated sounds, and comprising: in parallel several first means for detection each having a different and fixed value for at least one degree of freedom; mean for selecting the first mean for detection having a maximum signal to noise ratio; and mean for comparing the signal to noise ratio of the selected first mean for detection to a first determined threshold;

a second processing mean, allowing to detect impulsive sounds, and comprising: in parallel several second means for detection each having a different and fixed value for at least one degree of freedom; mean for selecting the second mean for detection having a maximum signal to noise ratio; and mean for comparing the signal to noise ratio of the selected second mean for detection to a second determined threshold;

mean for taking an alarm decision, indicating the presence of at least one marine animal, as a function of an output of the first processing mean and/or an output of the second processing mean.

5. LIST OF FIGURES

Other features and advantages of embodiments of the invention shall appear from the following description, given by way of an indicative and non-exhaustive examples and from the appended drawings, of which:

6. DETAILED DESCRIPTION

In all of the figures of the present document, identical elements and steps are designated by the same numerical reference sign.

In the example described below, we consider the detection of the presence of marine mammals, including cetaceans (mysticetes and odontocetes).

Figure 1:
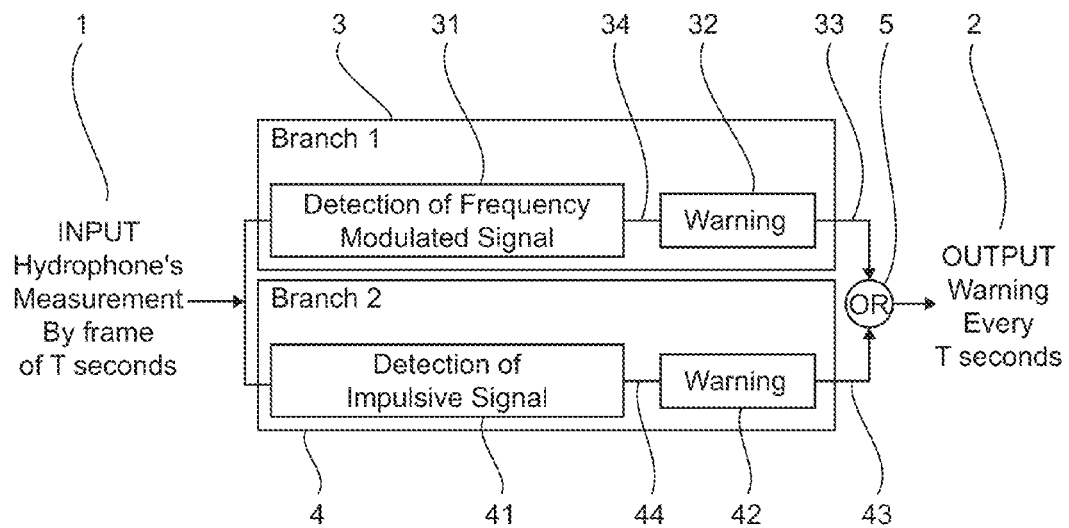
FIG. 1 is a schematic illustration of detection method according to a particular embodiment of the invention, comprising a branch for frequency modulated sounds and a branch for impulsive sounds.

Referring now to FIG. 1, we present a detection method according to a particular embodiment of the invention.

Figure 4:
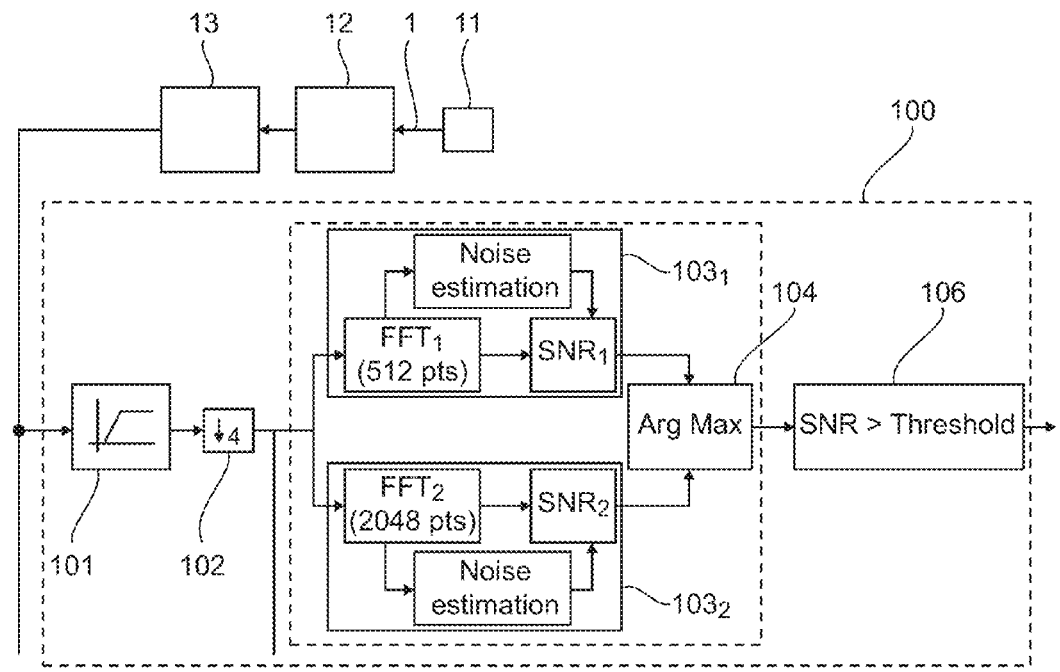
FIG. 4 is a schematic illustration of a particular embodiment of the detecting stage comprised in the branch for frequency modulated sounds.

The input 1 consists of measurements (sound pressure levels) collected by an acoustic sensor (e.g. a pressure sensor (hydrophone) or a particle motion sensor (geophone, accelerometer)) embedded for example in a standard instrumentation for geophysical surveys (air gun, streamers, . . . ). As shown in FIG. 4, the measurements collected by the acoustic sensor 11, before being provided to two branches 3 and 4, is for example amplified by a pre-amplifier 12 with variable gain, and then converted into digital form by an analog-digital converter (ADC) 13.

The output 2 of the scheme is a warning that inform of the presence of some marine mammals in the detection range of the acoustic sensor.

The input signal (measurements) is processed by frame of T seconds, so the detection and warning have sample rate of T seconds.

If the method is implemented in real time in a detection device, it comprises a step of transmitting the final alarm decision to a remote management device.

The process is divided in two branches, one (referenced 3) for the processing of frequency modulated sounds (mysticetes vocalization, odontocetes whistles) and the other (referenced 4) for the processing of impulsive sounds (clicks of odontocetes).

Each branch (3 or 4) comprises a detecting block (referenced 31 or 41, and detailed below) for the detection and a warning block (referenced 32 or 42).

The warning block referenced 32 takes a first intermediary alarm decision 33, indicating the presence of at least one marine mammal, as a function of the frequency modulated sound or sounds 34 actually detected by the detection block referenced 31.

The warning block referenced 42 takes a second intermediary alarm decision 43, indicating the presence of at least one marine mammal, as a function of the impulsive sound or sounds 44 actually detected by the detection block referenced 41.

The final alarm decision (i.e. the output 2) is a function (logical "OR" function in this example) of the first and second intermediary alarm decisions 33 and 43.

The operation of each warning block 32, 42 can be summarized as follows. As a first step, the warning block merges several individual detected sounds (for the warning block 32: whistles from the detection block 31; for the warning block 42: clicks from the detection block 41) in a single detection metrics. The detection metrics may be defined by the operator as for examples: the proportion of time covered by whistles or clicks in a reference running time interval; or the number of events (whistles or clicks) detected in a reference running time interval. Then the time series of the detection metrics is compared to a threshold (hard or soft). Every time the metrics is more than the threshold a detection warning is declared.

Figure 2:
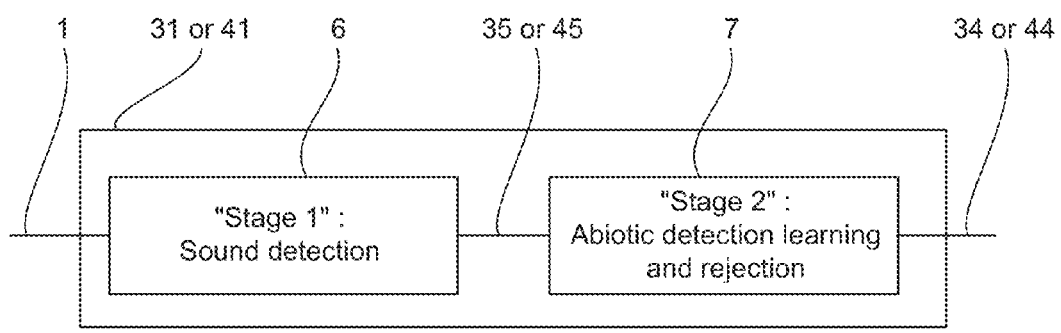
FIG. 2 is a generic illustration of a detecting block comprised in each of the branches shown in FIG. 1, and itself comprising a detecting stage and a learning and rejecting stage.

As shown in FIG. 2, each of the detecting blocks 31 and 41 comprises a detecting stage 6 (also called "stage 1"), for sound detection (see below the description of FIGS. 3, 4 and 5), and a learning and rejecting stage 7 (also called "stage 2" below), for abiotic sound learning and rejection (see below the description of FIGS. 6 and 7). The output of the detecting stage 6 is referenced 35 (for branch referenced 3) or 45 (for branch referenced 4). The output of the learning and rejecting stage 7 is the output of the detecting stage 6 and, as already mentioned above, is referenced 34 (for branch referenced 3) or 44 (for branch referenced 4).

Figure 3:
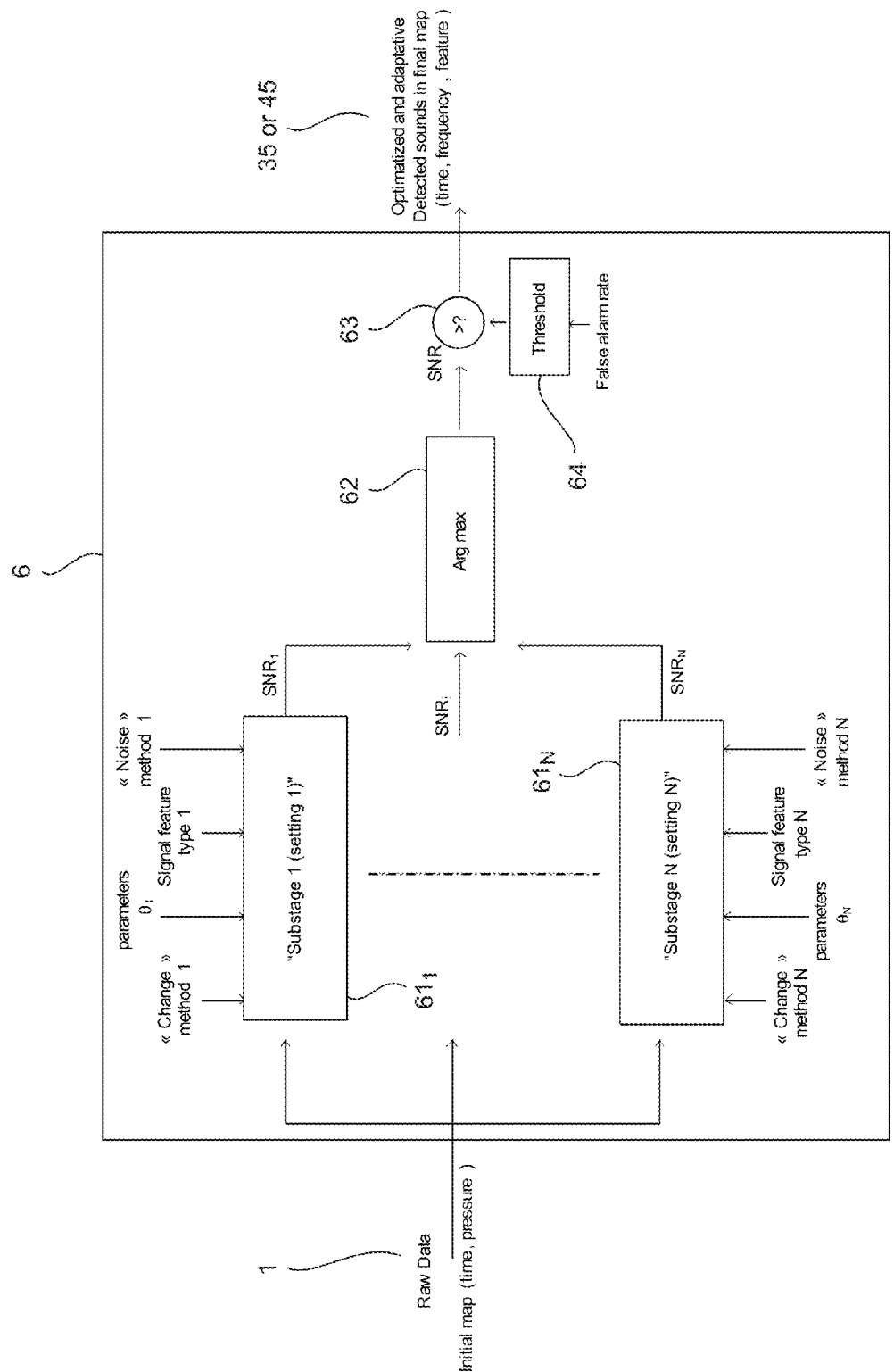
FIG. 3 is a generic illustration of the detecting stage shown in FIG. 2.

FIG. 3 is a generic illustration of the detecting stage 6 shown in FIG. 2. Basically, it comprises:
in parallel N detection channels, referenced $61_1$ to $61_N$ (also called "sub-stage i (setting i)", with i an integer from 1 to N and N an integer greater than 1);
a block 62 for selecting dynamically at each time (i.e. for every period T) the detection channel which optimizes the output SNR (Signal to Noise Ratio); and
a block 63 for performing detection only on the selected channel, by comparing the SNR of the selected channel to a determined threshold 64 (computed from theoretical assumption and the maximum acceptable false alarm rate).

Each of the N detection channels is composed by a first operation to present measurements in a new space of representation (basically time and frequency) and, in this new space of representation, a quantitative feature of sounds is mapped. Both space of representation and signal feature are chosen to separate as best as possible useful signal from noise. Then in this new space of representation, detection is performed by estimating a local SNR where Noise is estimated from the measurement maps.

In order to adapt with a large range of useful signal waveforms and noise characteristics, each of the N detection channels has a different and fixed value for one or several degrees of freedom:

the method and its settings (parameters) θ to change the space of representation (i.e. present the acoustic signal measurements in a new space of representation), the quantitative signal feature in which the processed data are mapped, in the new space of representation, and the method to estimate the noise characteristic.

As soon as theses degrees of freedom are chosen, each detection channel is optimized for one type of useful signal and one type of noise.

Ones must have in mind that the SNR value just before the final detection (i.e. the output of the block 62 and the input of the block 63) is an indicator of the optimality of the choice for the degrees of freedom.

This innovative general scheme, detailed above with FIGS. 1 and 2 can be applied and implemented, for example, on a DSP (Digital Signal Processor) for the two channel of our detector.

More generally, it is possible to consider that this innovative general scheme can be implemented equally well:

by the execution of a set of computer instructions executed by a reprogrammable computing machine such as a PC type apparatus, a DSP or a microcontroller; or else by a dedicated hardware machine or component such as an FPGA (Field Programmable Gate Array), an ASIC (Application-Specific Integrated Circuit) or any other hardware module.

In case the solution is implemented in a reprogrammable computing machine, the corresponding program (i.e. the set of instructions) can be stored in a non-transitory computer-readable carrier medium that is detachable (for example a floppy disk, a CD-ROM or a DVD-ROM) or non-detachable.

Figure 8:
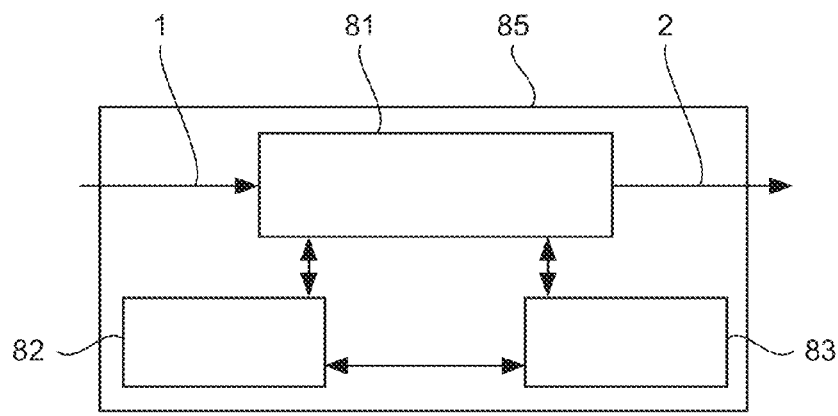
FIG. 8 shows the simplified structure of a detecting device according to a particular embodiment of the invention.

FIG. 8 shows the simplified structure of a detecting device according to a particular embodiment of the invention, with implementation on a DSP. The device 85 for automatically detecting marine animals comprises a DSP 81, a read-only memory (ROM) 82 and a random access memory (RAM) 83. The read-only memory 82 stores the executable code of the programs, which, when same are executed by the DSP, enable implementation of the innovative general scheme detailed above with FIGS. 1 and 2. Upon initialization, the aforementioned program code instructions are transferred to the random access memory 83 so as to be executed by the DSP 81. The random access memory 83 likewise includes registers for storing the variables and parameters required for this execution. The DSP 81 receives the measurements (sound pressure levels) (i.e. the input 1) and delivers the final alarm decision (i.e. the output 2).

FIG. 4 is a schematic illustration of a particular embodiment ("multi-FFT" approach) of the detecting stage 100 comprised in the branch 3 for frequency modulated sounds.

In this embodiment, the detecting stage 100 comprises:

a low pass filter 101;

a decimator 102 with a decimator factor of 4;

in parallel, two (N=2) detection channels $103_1$ and $103_2$, whose FFT lengths are 512 and 2048 respectively. Of course, the number N can be greater than 2;

a block 104 for selecting dynamically at each time (i.e. for every period T) the detection channel which optimises the output SNR (Signal to Noise Ratio);

a block 106 for performing detection only on the selected channel, by comparing the SNR of the selected channel to a determined threshold.

As mentioned above, if the method is implemented in real time in a detection device, it comprises a step of transmitting the final alarm decision to a remote management device. For example, in a context of seismic data acquisition in a marine environment, the detection device can be comprised in a streamer (sensors are distributed along cables in order to form linear acoustic antennas normally referred to as "streamers" or "seismic streamers"; the network of seismic streamers is towed by a seismic vessel). With this constraint of signal processing in real time, it is not possible to use a too large FFT length, which would involve a too long delivery time from the detection device to the management device. The couple of 512 and 2048 FFT lengths allows to meet the constraint of real-time signal processing.

Each of the N detection channels of the detecting stage is defined as follows:

the method to change the space of representation is a Fast Fourier Transform (FFT) with the length L of the FFT chosen as a parameters to set;

the signal feature (in which the acoustic signal measurements are mapped in the new space of representation) is energy; and the noise estimation method is a one order low pass Infinite Impulse Response filter.

In an alternative embodiment, the method to change the space of representation is not a Fast Fourier Transform (FFT) but a time frequency map method among the following list (non-exhaustive): zero-crossing, empirical mode decomposition (EMD), filter bank or wavelet transform.

Figure 5:
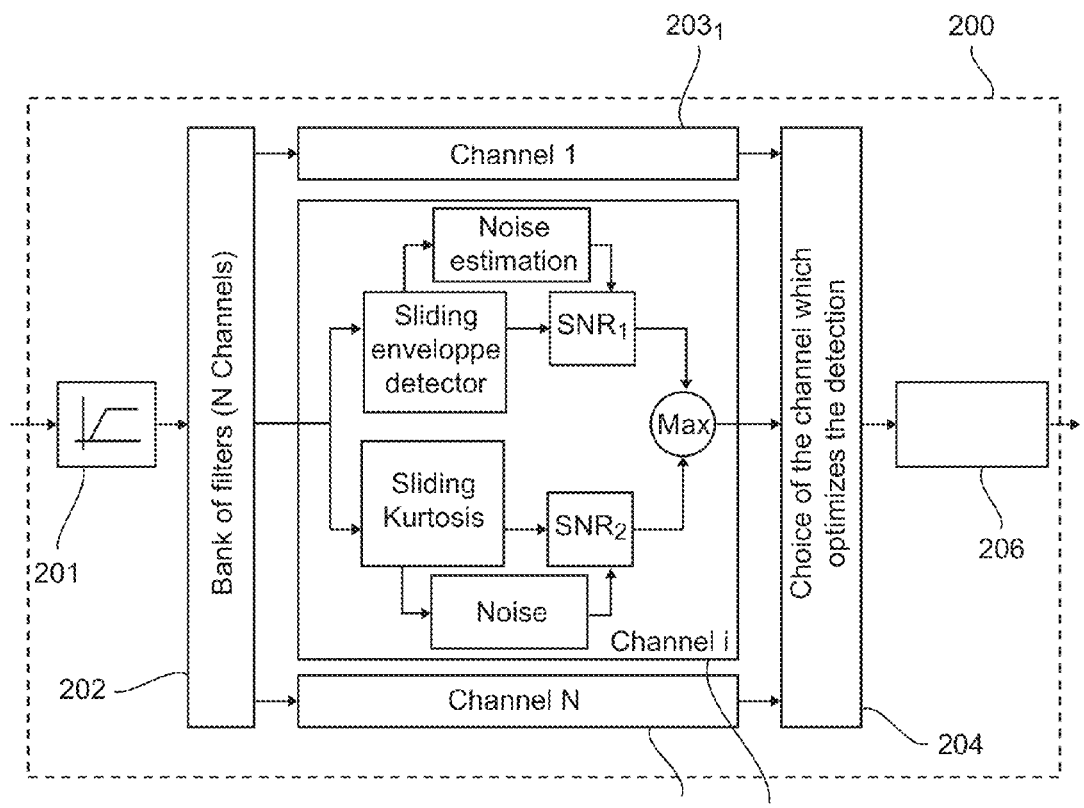
FIG. 5 is a schematic illustration of a particular embodiment of the detecting stage comprised in the branch for impulsive sounds.
Figure 6:
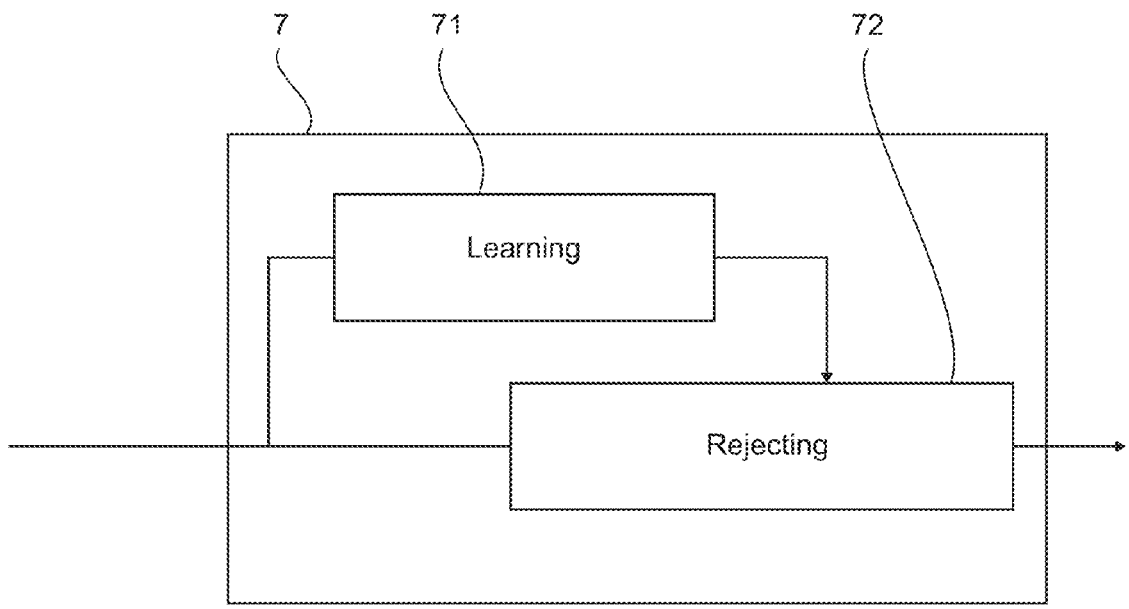
FIG. 6 is a generic illustration of the learning and rejecting stage shown in FIG. 2.

FIG. 5 is a schematic illustration of a particular embodiment ("filter bank with multiple order statistics" approach) of the detecting stage 200 comprised in the branch 4 for impulsive sounds.

In this embodiment, the detecting stage 200 comprises:

a high pass filter 201;

a bank 202 of N (e.g. N=6) Pass Band filters running in parallel, to present the acoustic signal measurements in a new space of representation;

in parallel, N detection channels $203_1$ to $203_N$. Each detection channel computes first and second SNRs (signal to noise ratios) using respectively a first and a second quantitative signal feature in which the acoustic signal measurements are mapped in the new space of representation. The maximum between the first and second SNRs is selected for the concerned detection channel. The first and second quantitative signal features are associated to different order statistics. In a preferred embodiment, the first quantitative signal feature is energy associated to a second order statistic, and the second quantitative signal feature is kurtosis associated to a fourth order statistic. The noise estimation method is a one order low pass Infinite Impulse Response filter. In alternative embodiments, the couple (energy kurtosis) can be changed to any other couple comprising two items of the following list (non-exhaustive): energy, skewness, kurtosis and alpha-stable parameter.

a block 204 for selecting dynamically at each time (i.e. for every period T) the detection channel which optimises the output SNR (Signal to Noise Ratio);

a block 206 for performing detection only on the selected channel, by comparing the SNR of the selected channel to a determined threshold.

Now be described with FIGS. 6 and 7, a particular embodiment of the learning and rejecting stage 7 shown in FIG. 2.

The detecting stage 100 ("multi-FFT" approach of FIG. 4), comprised in the branch 3 for frequency modulated sounds, and the detecting stage 200 ("filter bank with multiple order statistics" approach of FIG. 5), comprised in the branch 4 for impulsive sounds, optimize the detection rate of any sound measured by the acoustic sensor whatever the nature of the source.

However a passive detector device (e.g. embedded in a standard geophysical instrumentation) will be faced with lots of abiotic sound productions generated by the instrumentation itself. Their detection is a true sound detection but a false marine mammals detection.

In order to reduce the false alarm rate due to abiotic sounds, the learning and rejecting stage 7 is added, in each of branches 3 and 4, to learn what are these abiotic sound detections and how to eliminate them. The learning and rejecting stage 7 comprises:
  a learning block 71, adapted to determine rejected points of a time-frequency grid, as a function of a plurality of successive actually detected sounds; and
  a rejecting block 72, adapted to reject an actually detected sound which is located, in the time-frequency grid, on one of the rejected points.

The learning block 71 uses the realistic assumption that abiotic sound detections are usual whereas marine mammals detections are sparse. A running time frame period of length T is defined. On this period T, the sound detection stage 6 (i.e the detecting stage 100 for the branch 3 processing the frequency modulated sounds, and the detecting stage 200 for the branch 4 processing the impulsive sounds) maps the signal on a time frequency grid. Let be G(t,f) this grid. When time is running, the number of detections for each point of grid G(t,f) is summed with a time memory of D and divided by the total of number of iterations contain in D, to obtain the probability that one point of the grid is a false alarm due to abiotic sounds. The learning block 71 decide that a given point of the time-frequency grid is a rejected point if the associated probability is higher than a determined threshold.

Figure 7:
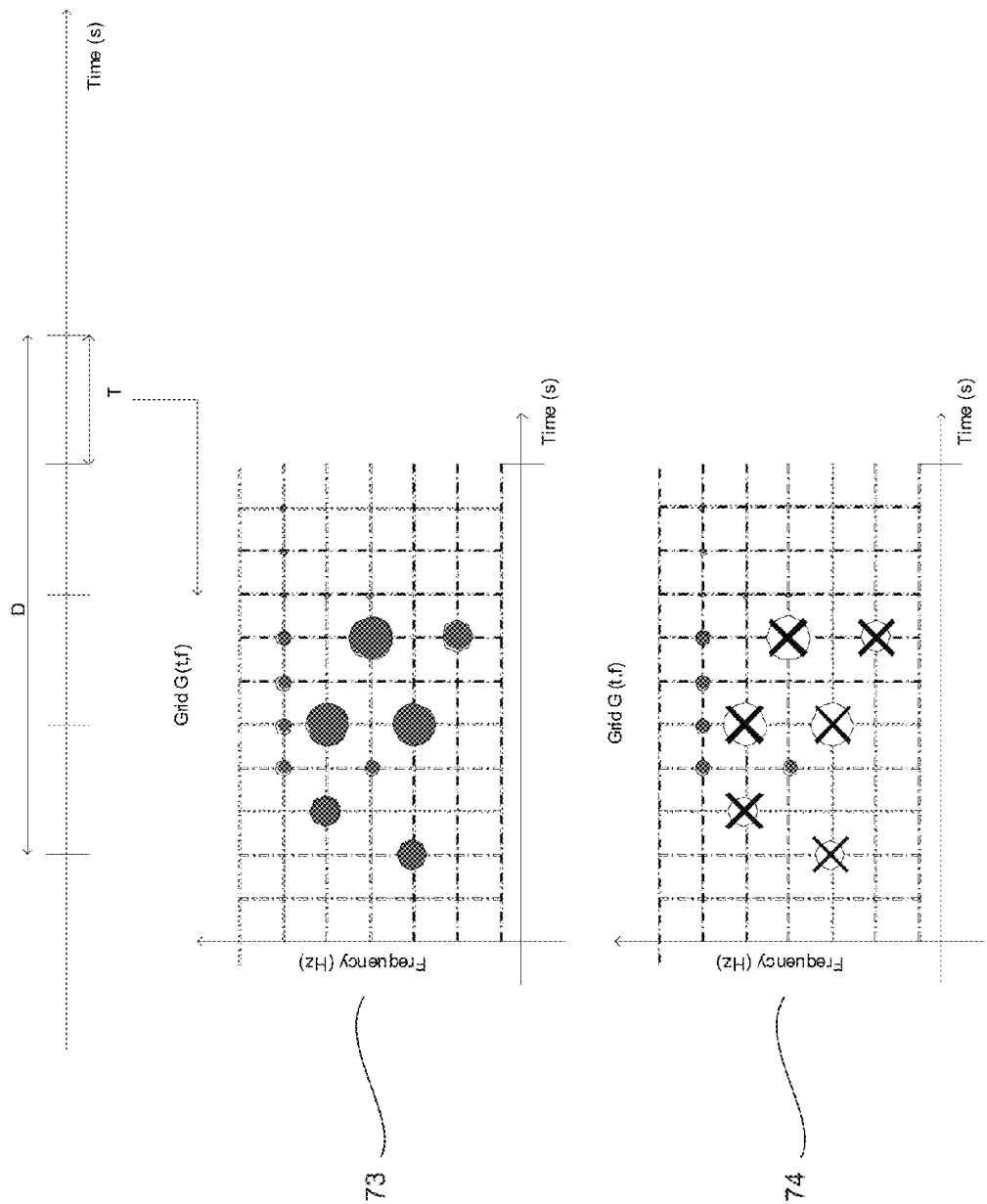
FIG. 7 is a schematic illustration of a particular embodiment of the learning and rejecting stage shown in FIG. 2.

In the grid 73 shown at the top of FIG. 7, the size of the circle located at a given point of the grid is proportional to the probability that this given point is a false alarm due to abiotic sounds (i.e. the size of the circle is proportional to the number of actually detected sounds which are located on this grid point).

In the grid 74 shown at the bottom of FIG. 7, the grid points marked with a cross are rejected points, to be used by the rejecting block 72 to decide whether an actually detected sound must be rejected or not.

At least one embodiment of the disclosure provides a technique for detecting marine animals, this technique treating sound productions of different marine animals in a single process (e.g. the entire sound production of marine mammals, including cetaceans (mysticetes and odontocetes)).

At least one embodiment provides a technique for detecting marine animals, this technique having the capacity to adapt to the properties of biological sound sources and to the properties of ambient noise.

At least one embodiment provides a technique for detecting marine animals, this technique being executed automatically, without requiring an operator and with a minimum number of preliminary configuration settings.

At least one embodiment provides a technique for detecting marine animals, allowing real time running in an embedded system (i.e. an autonomous communicating system).

At least one embodiment provides a technique for detecting marine animals, allowing to identify abiotic sound detections (e.g. due to seismic apparatus) and to reject them.

Although the present disclosure has been described with reference to one or more examples, workers skilled in the art will recognize that changes may be made in form and detail without departing from the scope of the disclosure and/or the appended claims.

The invention claimed is:

1. A method for automatically detecting marine animals, carried out by a detection device and comprising:
  a step of obtaining acoustic signal measurements collected by at least one acoustic sensor in a underwater environment;
  at least one of the following branches:
    a first branch comprising a step of detecting frequency modulated sounds by: implementing in parallel several first detection channels; selecting the first detection channel having a maximum signal to noise ratio; and comparing the signal to noise ratio of the selected first detection channel to a first determined threshold; and/or
    a second branch comprising a step of detecting impulsive sounds by: implementing in parallel several second detection channels; selecting the second detection channel having a maximum signal to noise ratio; and comparing the signal to noise ratio of the selected second detection channel to a second determined threshold; and
  a step of taking an alarm decision, indicating presence of at least one marine animal, as a function of an output of the first branch and/or an output of the second branch,
  wherein each first or second detection channel has a different and fixed value for at least one degree of freedom belonging to the group consisting of:
    methods, and corresponding parameters, to present the acoustic signal measurements in said new space of representation;
    quantitative signal features in which the acoustic signal measurements are mapped in the new space of representation;
    methods to estimate the noise characteristic.

2. The method according to claim 1, wherein said method comprises said first branch and said second branch.

3. The method according to claim 1, wherein each first detection channel uses a Fast Fourier transform, with a different length, to present the acoustic signal measurements in a new space of representation, and uses energy as a quantitative signal feature in which the acoustic signal measurements are mapped in the new space of representation.

4. The method according to claim 1, wherein each second detection channel implements the following steps:
  using a pass band filter, with a different pass band, to present the acoustic signal measurements in a new space of representation;
  computing first and second signal to noise ratios using respectively a first and a second quantitative signal feature in which the acoustic signal measurements are mapped in the new space of representation, said first and second quantitative signal features being associated to different order statistics; and
  selecting a maximum ratio among the first and second signal to noise ratios, to be used in the step of selecting the second detection channel having a maximum signal to noise ratio.

5. The method according to claim 4, wherein said first quantitative signal feature is energy associated to a second order statistic, and said second quantitative signal feature is kurtosis associated to a fourth order statistic.

6. The method according to claim 1, wherein at least one of said first and second branches comprises:
  a step of learning, adapted to determine rejected points of a time-frequency grid, as a function of a plurality of successive actually detected sounds; and
  a step of rejecting, adapted to reject an actually detected sound which is located, in the time-frequency grid, on one of the rejected points;
  and wherein the step of taking an alarm decision is carried out as a function of the sound or sounds actually detected and not rejected.

7. The method according to claim 6, wherein said step of learning comprises the following steps, for at least one given point of the time-frequency grid:
  obtaining a number of actually detected sounds which are mapped on said given point of the time-frequency grid, among a plurality of successive actually detected sounds over a determined number of iterations;
  deciding that said given point of the time-frequency grid is a rejected point if said number is higher than a determined threshold.

8. The method according to claim 1, wherein the method is implemented in real time in said detection device, and the method comprises a step of transmitting said alarm decision to a remote management device.

9. A non-transitory computer-readable carrier medium storing a program which, when executed by a computer or a processor, causes the computer or the processor to carry out a method for automatically detecting marine animals, carried out by a detection device and comprising:
  a step of obtaining acoustic signal measurements collected by at least one acoustic sensor in a underwater environment;
  at least one of the following branches:
    a first branch comprising a step of detecting frequency modulated sounds by: implementing in parallel several first detection channels; selecting the first detection channel having a maximum signal to noise ratio; and comparing the signal to noise ratio of the selected first detection channel to a first determined threshold; and/or
    a second branch comprising a step of detecting impulsive sounds by: implementing in parallel several second detection channels; selecting the second detection channel having a maximum signal to noise ratio; and comparing the signal to noise ratio of the selected second detection channel to a second determined threshold; and
  a step of taking an alarm decision, indicating presence of at least one marine animal, as a function of an output of the first branch and/or an output of the second branch,
  wherein each first or second detection channel has a different and fixed value for at least one degree of freedom belonging to the group consisting of:
    methods, and corresponding parameters, to present the acoustic signal measurements in said new space of representation;
    quantitative signal features in which the acoustic signal measurements are mapped in the new space of representation;
    methods to estimate the noise characteristic.

10. A detection device for automatically detecting marine animals, the detection device comprising:
  means for obtaining acoustic signal measurements collected by at least one acoustic sensor in a underwater environment;
  at least one of the following processing means:
    first processing means, allowing to detect frequency modulated sounds, and comprising: in parallel several first means for detection; means for selecting the first means for detection having a maximum signal to noise ratio; and means for comparing the signal to noise ratio of the selected first means for detection to a first determined threshold; and/or
    second processing means, allowing to detect impulsive sounds, and comprising: in parallel several second means for detection; means for selecting the second means for detection having a maximum signal to noise ratio; and means for comparing the signal to noise ratio of the selected second means for detection to a second determined threshold; and
  means for taking an alarm decision, indicating presence of at least one marine animal, as a function of an output of the first processing means and/or an output of the second processing means,
  wherein each first or second means for detection has a different and fixed value for at least one degree of freedom belonging to the group consisting of:
    methods, and corresponding parameters, to present the acoustic signal measurements in the new space of representation;
    quantitative signal features in which the acoustic signal measurements are mapped in said new space of representation;
    methods to estimate the noise characteristic.

* * * * *